United States Patent
Bahk (10) Patent No.: US 10,498,677 B2
(45) Date of Patent: Dec. 3, 2019

(54) TURN-BASED PICTORIAL CHATTING APPLICATION AND METHOD FOR PICTORIAL CHATTING INSTALLED IN USER TERMINAL

(71) Applicant: Jae Hyun Bahk, Gumi (KR)

(72) Inventor: Jae Hyun Bahk, Gumi (KR)

(*) Notice: Subject to any disclaimer, the term of this patent is extended or adjusted under 35 U.S.C. 154(b) by 191 days.

(21) Appl. No.: 15/558,202

(22) PCT Filed: Apr. 13, 2017

(86) PCT No.: PCT/KR2017/004000
§ 371 (c)(1),
(2) Date: Sep. 14, 2017

(87) PCT Pub. No.: WO2017/188634
PCT Pub. Date: Nov. 2, 2017

(65) Prior Publication Data
US 2018/0109479 A1    Apr. 19, 2018

(30) Foreign Application Priority Data
Apr. 27, 2016 (KR) .................. 10-2016-0051270

(51) Int. Cl.
H04L 12/58      (2006.01)
H04M 1/725     (2006.01)
G06T 11/20      (2006.01)
G06T 11/00      (2006.01)
G06T 13/80      (2011.01)

(52) U.S. Cl.
CPC ............ *H04L 51/10* (2013.01); *G06T 11/001* (2013.01); *G06T 11/203* (2013.01); *H04L 51/16* (2013.01);
(Continued)

(58) Field of Classification Search
CPC ....... H04L 51/10; H04L 51/046; H04L 51/16; H04L 51/00; H04M 1/72552;
(Continued)

(56) References Cited

U.S. PATENT DOCUMENTS

2004/0044732 A1* 3/2004 Fushiki .................. G06T 11/60
                                                                709/205
2005/0064858 A1* 3/2005 Makela ................. H04M 3/567
                                                                455/419
(Continued)

FOREIGN PATENT DOCUMENTS

KR          100770892 B1    10/2007
KR       20110115357 A     10/2011
(Continued)

*Primary Examiner* — Ruolei Zong
(74) *Attorney, Agent, or Firm* — Gokalp Bayramoglu (57) ABSTRACT

The present disclosure relates to a turn-based pictorial chat application and a method for a pictorial chatting installed in a user terminal, which comprises storing a process of completing a picture in a chronological order from a start of drawing the picture when a first user draws the picture through a picture input window displayed on a display part of a user terminal, wherein a plurality of stage data capable of distinguishing positions are inserted according to a degree of completion of the picture; transmitting the stored picture to a user terminal of a second user as a chat participant; displaying the transmitted picture on a display of the user terminal of the second user; and displaying the picture drawn on the user terminal in chronological order according to the selection of the second user.

11 Claims, 6 Drawing Sheets

(52) U.S. Cl.
CPC ......... *H04M 1/72552* (2013.01); *G06T 13/80* (2013.01)

(58) Field of Classification Search
CPC .... H04M 1/72555; G06F 16/00; G06Q 50/30; G06T 11/001; G06T 11/203; G06T 11/60; G06T 13/80
USPC .......................................................... 709/206
See application file for complete search history.

(56) References Cited

U.S. PATENT DOCUMENTS

| | | |
|---|---|---|
| 2006/0148527 A1 | 7/2006 | Blount |
| 2006/0209802 A1* | 9/2006 | Kang ................ H04L 29/12009 370/352 |
| 2010/0245563 A1* | 9/2010 | Golovchinsky .......... H04N 7/18 348/135 |
| 2011/0061005 A1* | 3/2011 | Zha ..................... H04L 12/1818 715/753 |
| 2013/0038613 A1* | 2/2013 | Kim .................. H04M 1/72555 345/473 |
| 2015/0002435 A1* | 1/2015 | Shimizu .............. G06F 3/04883 345/173 |
| 2015/0309720 A1* | 10/2015 | Fisher ................ G06F 3/04847 715/752 |

FOREIGN PATENT DOCUMENTS

| | | |
|---|---|---|
| KR | 20130017100 A | 2/2013 |
| KR | 101597819 B1 | 2/2016 |

* cited by examiner

Playback/Pause/Stop/Backward/Forward

TURN-BASED PICTORIAL CHATTING APPLICATION AND METHOD FOR PICTORIAL CHATTING INSTALLED IN USER TERMINAL

CROSS REFERENCE TO RELATED APPLICATIONS

This application is the national phase of International Application No. PCT/KR2017/004000, filed on Apr. 13, 2017, which is based upon and claims priority to Korean Patent Application No. 10-2016-0051270, filed on Apr. 27, 2016, the entire contents of which are incorporated herein by reference.

TECHNICAL FIELD

The present disclosure relates to a turn-based pictorial chatting application and a method for a pictorial chatting installed on a user terminal, and more particularly, to a turn-based pictorial chatting application and a method for pictorial chatting application installed on a user terminal.

BACKGROUND

Recently, smart devices equipped with a touch function have been popularized, and various chat applications to be used with such smart devices have been released. Most chat applications mainly include inputting characters using a character input module provided by a user terminal, and include a function of selecting and displaying predetermined static or dynamic images. Such conventional chat applications use a predetermined image to display a user's emotions or the like, so that contents that can be input are limited and a degree of freedom is decreased.

In consideration of such a problem, there have been proposed methods to communicate emotions and the like to a chatting party. Even in the case that a user manually inputs handwriting, in this way, only one user can display directly written text or a drawn picture to another user. An example of a chat application that sends a user's handwriting to another user by chatting is Korean Patent No. 10-1597819 (Registered on Feb. 19, 2016; "PAINT CHAT DEVICE BETWEEN COMMUNICATION TERMINALS").

The above-mentioned patent discloses a technique of placing a picture input field area on a touch screen, image the input picture or text and send the image to the user terminal of the chatting party. The image at this time can be synthesized according to the user's intention. However, the contents of the above mentioned registered patent do not allow a plurality of chat participants to chat together while drawing pictures, since the process of drawing pictures is unknown, there is a problem that it is not easy to accurately understand the user intention to be transmitted by the picture.

The above mentioned registered patent allows pictures to be drawn and sent by the chatting party, but there is no way to search for specific pictures received in previous chats in the future, so it may be difficult to search for pictures that were sent in previous chats.

SUMMARY

Technical Problem

In order to solve the above problems, an object of the present disclosure is to provide a turn-based pictorial chatting application and a method for a pictorial chatting installed in a user terminal, in which a plurality of chat participants complete pictures together and exchange ideas.

Another object of the present disclosure is to provide a turn-based pictorial chatting application and a method for pictorial chatting installed in a user terminal, the process of completing a picture can be seen in chronological order so that the other party can accurately understand the intention to be communicated by the picture, it is possible to gauge a user's thoughts through the sharing of emotions and pictures.

Another object of the present disclosure is to provide a turn-based pictorial chatting application and a method for a pictorial chatting installed in a user terminal, in which previously completed pictures can be easily searched and found.

Technical Solution

One aspect of the present disclosure provides a method for pictorial chatting which may comprise storing a process of completing a picture in chronological order from a start of drawing the picture when a first user starts drawing the picture through a picture input window displayed on a display part of a user terminal, wherein a plurality of stage data capable of distinguishing chronological stages of the picture are inserted according to a degree of completion of the picture; transmitting the stored picture to a user terminal of a second user as a chat participant; displaying the transmitted picture on a display of the user terminal of the second user; and displaying the picture drawn on the user terminal in chronological order according to the selection of the second user or displaying the picture such that the stage data is inserted according to the selection of the second user.

In a preferred embodiment of the present disclosure, the method may further comprise completing the picture by adding another picture by the second user to the picture displayed on the user terminal of the second user.

In a preferred embodiment of the present disclosure, the method may further comprise transmitting a picture to the user terminal of the first user by drawing a picture different from the picture displayed on the user terminal of the second user; and completing a picture by editing a picture drawn by the first user in the storing the process of completing the picture and a picture drawn and transmitted by the second user.

In a preferred embodiment of the present disclosure, the second user may search for a position at which the stage data is inserted and edit the picture at a specific stage.

In a preferred embodiment of the present disclosure, the method may further comprise making a search possible by adding a text index to data of the completed picture; wherein the text index is a text input by the first user or the second user in the process of completing the picture.

Another aspect of the present disclosure provides a turn-based pictorial chatting application installed in a user terminal to enable chatting with a plurality of users and may comprise a picture input module for providing a picture input window on a portion of a display screen of the user terminal and storing picture input data in a picture storage module in chronological order so that data of a picture input to the picture input window can be checked according to chronological order in a picture storage module so as to determine a process of drawing a picture input in the picture input window, wherein stage data for determining the degree of completion of the figure is inserted and stored; and a picture playback module which can playback the picture in chronological order and moves to a position in which the stage data is inserted to identify a picture at the stage.

A preferred embodiment of the present disclosure may further comprise an index insertion module for adding a text index to picture data stored in the picture storage module, thus making a search for a stored picture possible, using text input.

In a preferred embodiment of the present disclosure, the index insertion module may extract a word matching the predetermined word in the text input by the users in the process of drawing the picture and use the extracted word as the text index.

A preferred embodiment of the present disclosure may further comprise a picture editing module capable of editing the picture in a state in which a picture at a selected stage is displayed using the picture playback module.

In a preferred embodiment of the present disclosure, the picture editing module may delete a specific part of the picture in the selected stage, and receive and modify the picture again, adjust a size of a part of the picture, change a color of the picture, or combine the picture with another picture to make a single picture.

Advantageous Effects

According to the embodiments of the present disclosure, a turn-based pictorial chatting application and a method for a pictorial chatting installed in a user terminal may have effect in which a large number of chat participants can draw a picture in a turn-based manner, and communicate their opinions to each other, thereby enhancing the efficiency of sharing ideas and communicating intentions.

According to the embodiments of the present disclosure, a process of completing a picture may be viewed in chronological order so that the other party can accurately understand the intention being communicated by the picture, so that it is possible to understand the thoughts of the other party through the sharing of emotions and pictures.

According to the embodiments of the present disclosure, text entered is determined to be a keyword that can be used to search for a completed picture in the process of chatting by drawing a picture, so that the previously completed picture can be easily searched and retrieved.

-Reference Numbers-

| | |
|---|---|
| 31: text input module | 32: text display module |
| 33: picture input module | 34: picture storage module |

-continued

-Reference Numbers-

| | |
|---|---|
| 35: playback module | 36: index insertion module |
| 37: picture editing module | |

DETAILED DESCRIPTION OF INVENTION

The embodiments of the present disclosure can have various changes made thereto and may have various embodiments, while specific embodiments will be described in detail with reference to the drawings. It should be understood, however, that the embodiments of the present disclosure are not intended to be limited to the specific embodiments but include all modifications, equivalents, and alternatives falling within the spirit and scope of embodiments of the present disclosure.

Terms including ordinal terms, such as first, second, etc., may be used to describe various elements, but the elements are not limited to these terms. The terms are used only for the purpose of distinguishing one component from another. For example, without departing from the scope of the embodiments of the present disclosure, a first element may be referred to as a second element, and similarly, a second element may also be referred to as a first element. The term and/or includes any combination of a plurality of related listed items or any of the plurality of related listed items.

The terminology used in the embodiments of the present disclosure is used only to describe a specific embodiment and is not intended to limit the embodiments of the present disclosure. The singular forms "a," "an," and "the" include plural referents unless the context clearly dictates otherwise. In the embodiments of the present disclosure, while terms such as "comprise (or include)", or "have", or the like designate the presence of stated features, integers, steps, operations, elements, parts, or combinations thereof, it is to be understood that the foregoing does not preclude the presence or addition of other features, numbers, steps, operations, elements, parts, or combinations thereof.

Unless otherwise defined, all terms used herein, including technical or scientific terms, have the same meaning as the meaning which would be commonly understood by one of ordinary skill in the art to which the embodiments of the present disclosure belong. Terms such as those defined in commonly used dictionaries should be interpreted as having a meaning consistent with the meaning in the context of the related art, are not to be construed in an idealized or overly formal sense, unless expressly defined to the embodiments of the present disclosure.

A turn-based pictorial chatting application and a method for a pictorial chatting installed on a user terminal of the present disclosure will be described in detail with reference to the accompanying drawings.

Figure 1:
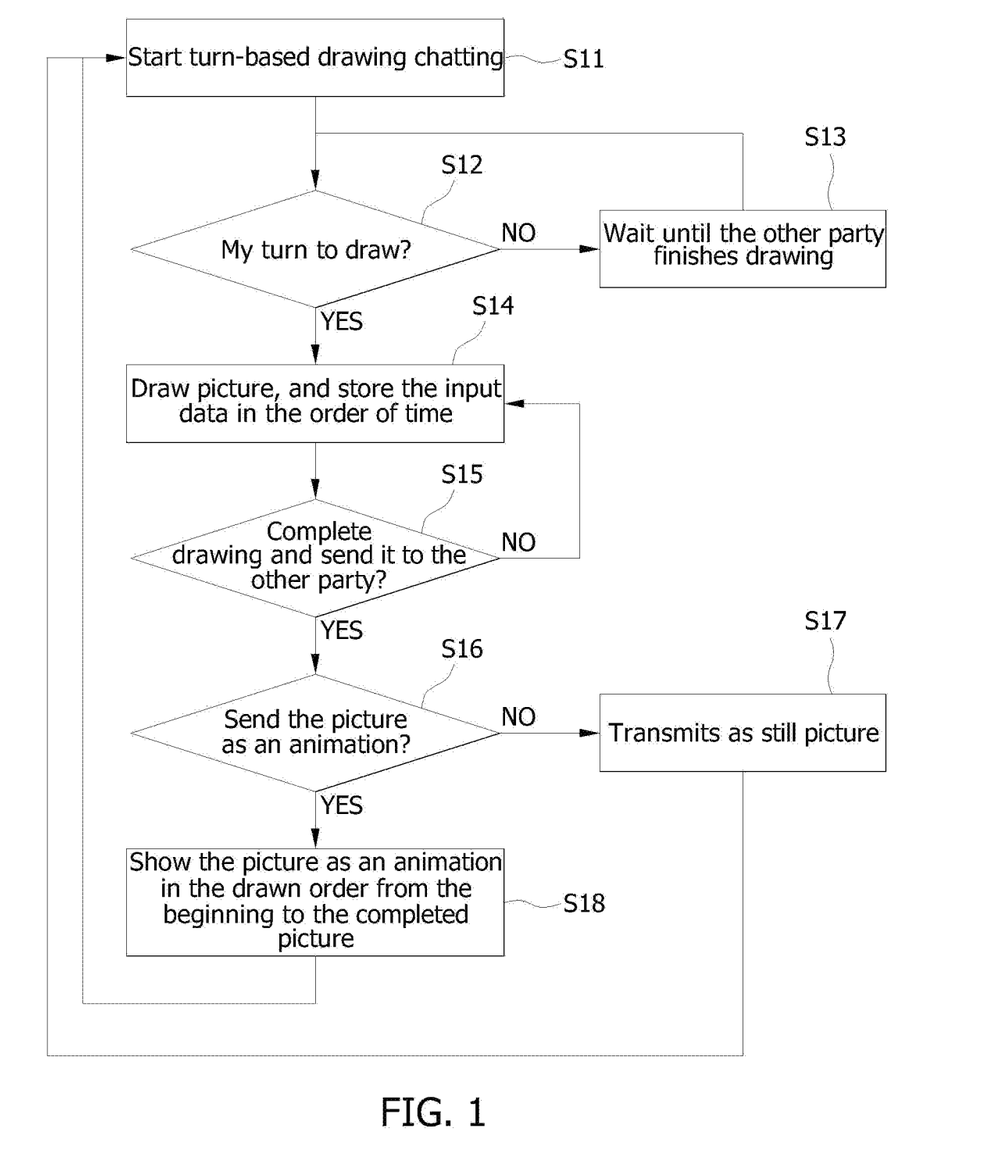
FIG. 1 is a flowchart of a method for pictorial chatting according to an embodiment of the present disclosure.

FIG. 1 is a flowchart of a method for pictorial chatting according to an embodiment of the present disclosure.

Referring to FIG. 1, a method for a pictorial chatting according to an embodiment of the present disclosure includes: step S11 of starting turn-based picture-drawing chatting using a pictorial chat application installed on a terminal of a user, step S12 of determining whether or not a first user participating in the chatting is in turn to draw a picture, and step S13 of waiting when a second user, the other party, is in turn to draw the picture, step S14 of receiving a picture in a picture input window of the pictorial chat application when the first user is in turn to draw the picture as a result of the determination in step S12, step S15 completing the drawing, determining whether or not to send the drawn picture to the other party, and when the drawing in not complete, returning to step S14, step S16 of determining whether or not the completed picture is to be transmitted as an animation when the drawing is completed as a result of the determination in step S15, and step S17 of transmitting the picture as a result of the determination of step S16 or step S18 of transmitting an animation including a process of drawing the picture.

Each of the above steps is performed by a function module provided in a pictorial chat application stored in the user terminal.

FIG. 1 illustrates the operation steps of the pictorial chat application stored in the user terminal of the first user, the operation steps drawing and transmitting a picture. Operation steps of the pictorial chat application stored in the user terminal of the second user, which performs pictorial chat with the first user, are as follows.

Figure 2:
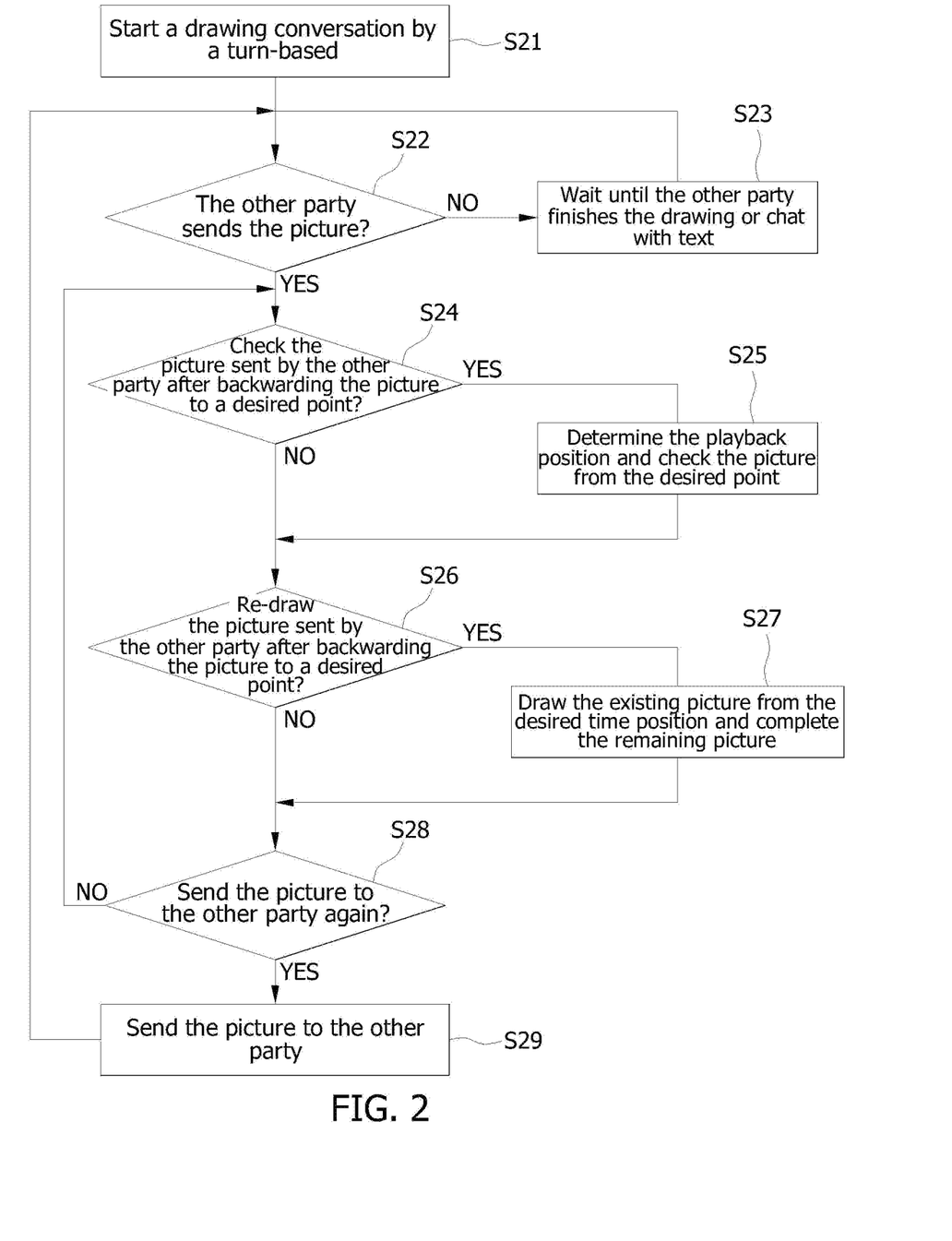
FIG. 2 is an operational flowchart of a turn-based pictorial chatting application stored in a user terminal of a second user.

FIG. 2 is an operational flowchart of a turn-based pictorial chat application stored in a user terminal of a second user.

Referring to FIG. 2, the turn-based pictorial chat application includes: step S21 of executing a pictorial chat application, step S22 of determining whether or not a picture sent by the first user has been received, step S23 of waiting or chatting by inputting text when the first user, the other chatting party, has not sent the picture as a result of the determination in step S22, step S24 of receiving an input regarding whether or not to determine a display state of the picture by returning to a previous specific point in time after displaying the picture on the user terminal of the second user when the picture is received as the result of the determination in step S22, step S25 of returning the playback position to a specific previous point in time, when it is determined in step S24 to return to a previous point in time, step S26 of determining whether or not the picture sent by the other party is to be redrawn after returning to a desired point when it is determined in step S24 to maintain the current display state, step S27 of receiving an input picture through the picture input window and editing the originally received picture after displaying the picture so that the process of completing the picture can be confirmed when it is determined that the picture is to be redrawn as a result of the determination in step S26, step S28 of determining whether or not to transmit the picture to the first user, the other chat party, when it is determined that the picture is not to be redrawn as a result of the determination in step S26, and when it is determined not to transmit the picture to the first user, returning to step S24, step S29 of, when it is determined in step S28 to transmit the picture, transmitting the picture to the other party and returning to the step S22.

Figure 3:
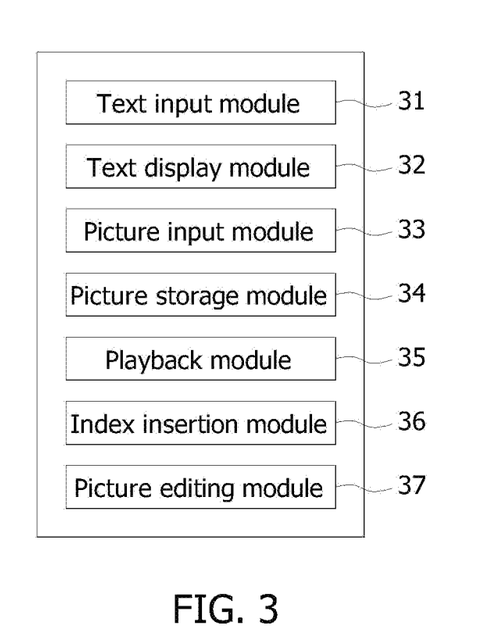
FIG. 3 is a structural diagram of a pictorial chatting application installed in a user terminal according to an embodiment of the present disclosure.

FIG. 3 is a structural diagram of a pictorial chat application installed on a user terminal according to an embodiment of the present disclosure.

Referring to FIG. 3, a pictorial chat application installed on a user terminal includes: a text input module 31 for providing a key input unit so that a user can input text; a text display module 32 for displaying conversation contents on a display of the user terminal; a picture input module 33 for providing a picture input window to a portion of the display of the user terminal and receiving an input picture drawn by the user; a playback module 35 for playing back a picture drawn by the user or a picture received from another chat participant; an index insertion module 36 for inserting the text input via the text input module 31 as an index into the completed picture data while the picture is being input via the picture input module 33; a picture storage module 34 for storing a completed picture in which the index is inserted; and a picture editing module 37 for editing the picture.

Hereinafter, the method for a pictorial chatting of the present disclosure configured as described above, as well as the configuration and the operation of the pictorial chatting application installed on the user terminal to enable pictorial chatting, will be described in more detail.

Figure 4:
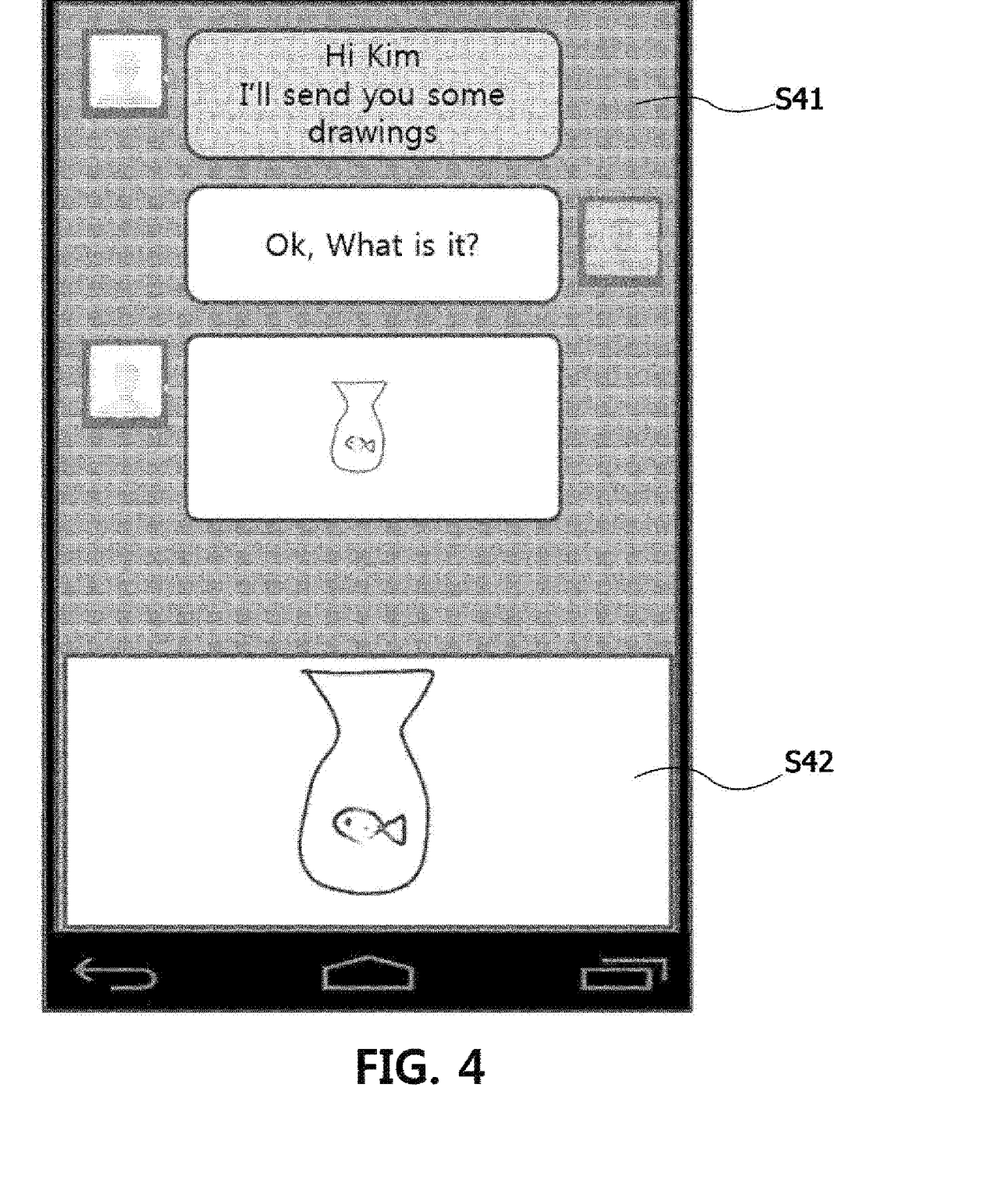
FIGS. 4 and 5 are displays of a state in which a pictorial chatting application is executed in a user terminal, respectively.
Figure 5:
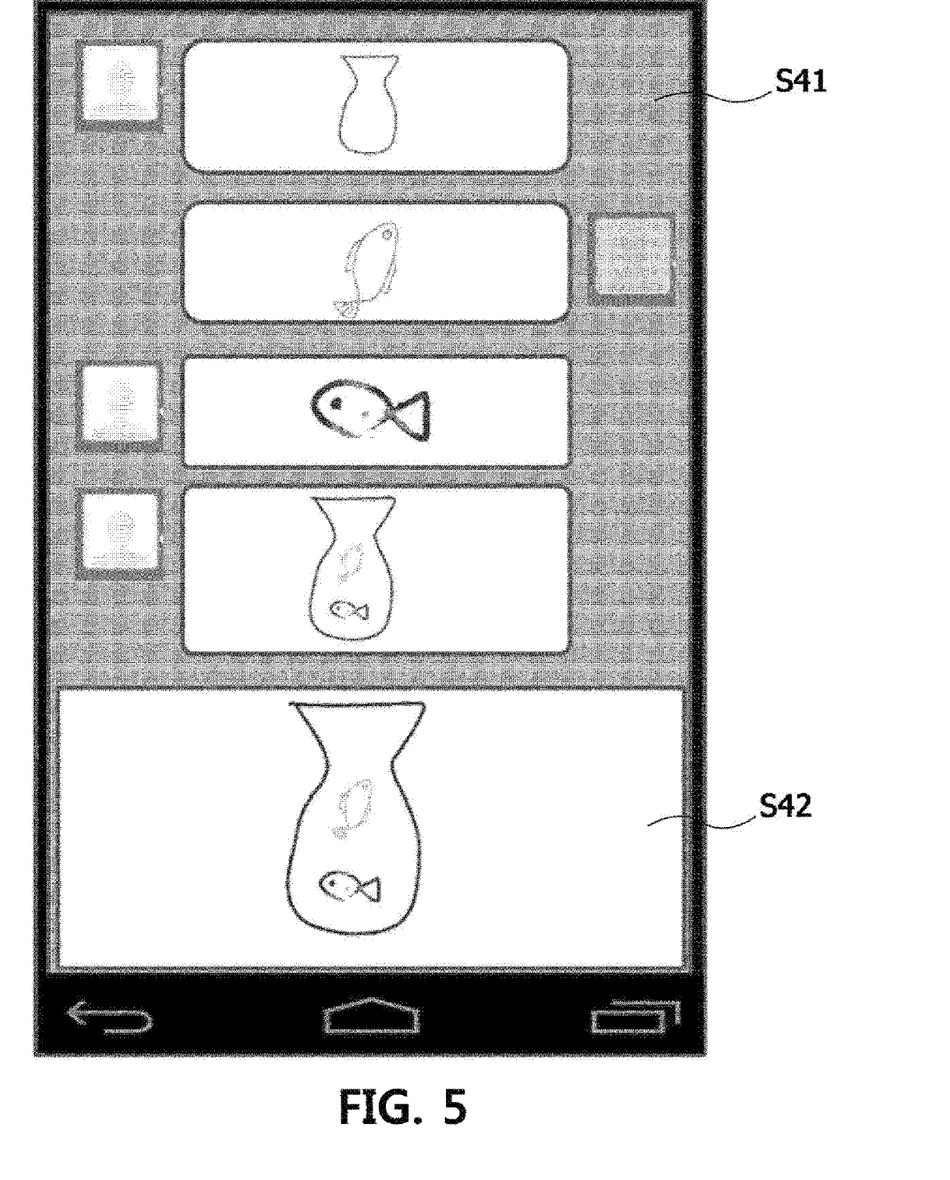

FIGS. 4 and 5 are displays of a state in which a pictorial chat application is executed in a user terminal, respectively.

While a first user and a second user are chatting by inputting text using the text input module 31 after executing a pictorial chat application installed on user terminals thereof, when the first user draws a picture on a picture input window 42 displayed on a portion of the user terminal, the input module 33 receives the process from the start to the completion of the drawing, stores the received process in the picture storage module, and displays the completed picture on the display window 41, as selected by the first user or the second user.

Here, the user terminal may be a smart phone, or a smart pad, and any other communicable devices including a display can be used regardless of the form thereof.

Referring to FIG. 5, each of the first user and the second user can respectively draw a picture in turns and transmit the drawn picture to the terminal of the other party.

When the first user, identified in turn to draw a picture in step S12, draws a picture on the picture input window 42, the picture is input via the picture input module 33 and is stored in the picture storage module 34 as in step S14.

When the completed picture is stored in the picture storage module 34, the process of the picture drawing is stored in the order of time. Play, pause, stop, backward, and forward functions may be executed using the picture playback module 35.

When transmitting the picture stored in the picture storage module 34, it is determined whether to send a still image or an animation image as in step S16.

The animation includes data capable of displaying the process of picture drawing in the order of time, and the still image is a simple image data in which the data for the process of picture drawing is omitted.

Figure 6:
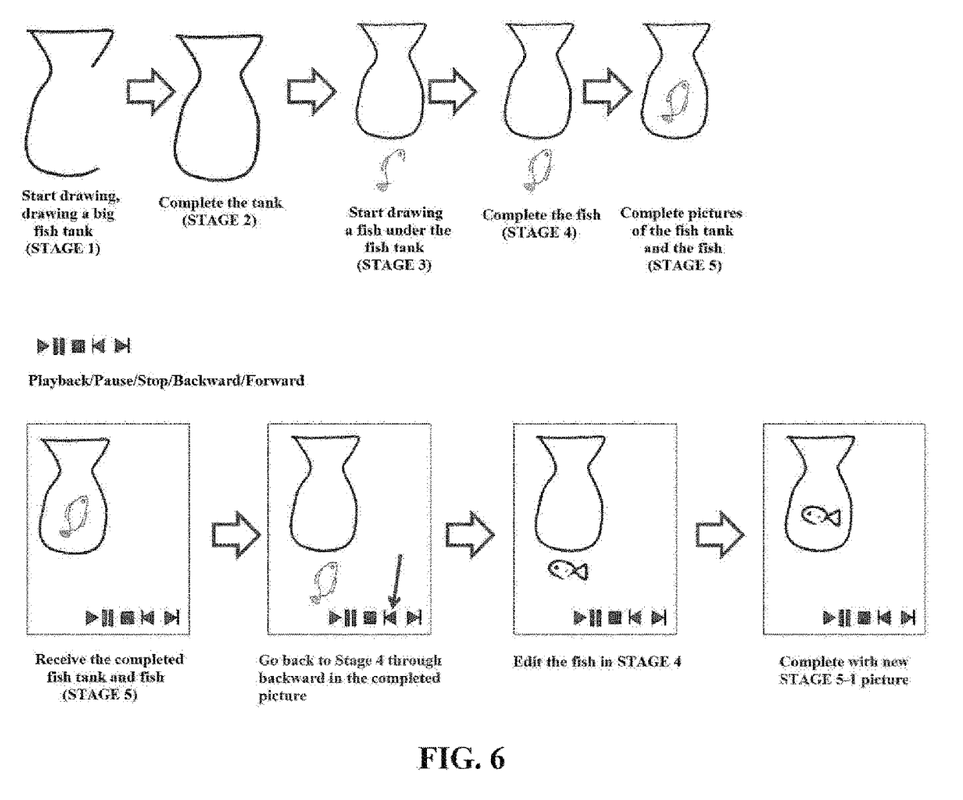
FIG. 6 is an explanatory diagram of the animation picture.

FIG. 6 is an explanatory diagram of the animation picture.

Referring to FIG. 6, when a user starts to draw a fish tank, the process is stored in the order of time. When the drawing of the fish tank is completed, the user starts to draw fish under the fish tank. When the drawing of fish is completed, the user can complete a picture with the fish in the fish tank by inserting the picture of the fish into the picture of the fish tank using the picture editing module 37.

The picture playback module 35 displaying the completed picture as described above, displays the play, pause, stop, backward, and forward buttons together, and can display the process of picture drawing.

That is, the process of completing the picture as shown in step S25 can be determined in the order of time using the picture playback module 35 of the turn-based chat application installed on the user terminal that received the picture.

In this regard, the stage data can be inserted into picture data according to the completeness of a picture in the process of picture drawing. The stage data can be understood as a concept of executing a DO or UNDO command of a general picture or document creation tool, and is characterized in that the previous state is not stored in the virtual memory but directly stored in the picture data.

As shown in FIG. 6, according one embodiment relating to the insertion of the stage data, information regarding a first step (STAGE1) of starting drawing a fish tank, information regarding a second step (STAGE2) of completing a picture of the fish tank, information regarding a third step (STAGE 3) of starting to draw a picture of a fish under the picture of the fish tank, information regarding a fourth step (STAGE4) of completing the picture of the fish, and information regarding a fifth step (STAGE 5) of completing a picture with the fish in the fish tank are respectively stored.

The second user who received the picture with the fish in the fish tank of the fifth step (STAGE 5) can check the picture status of the first step (STAGE 1) to the fourth step (STAGE 4) by selecting the backward button. It is possible to check the process of drawing the picture by continuously replaying the process from the first step (STAGE 1) to the fifth step (STAGE 5).

In addition, the second user can modify a portion of the received picture. For this purpose, the picture can be displayed in a state corresponding to one of the first to fifth steps (STAGE1 to STAGE5), and then another picture can be added or the picture can be modified.

For example, when the fish is unsatisfactory, it is possible to display the picture state corresponding to the fourth step (STAGE 4), erase the drawn fish, edit a new fish, and complete a picture of a new step (STAGE-1).

The specific embodiment comprised of the first step (STAGE1) to the fifth step (STAGE5) is merely an example. In the present disclosure, the data can be moved to a corresponding position after inserting data capable of distinguishing each step. The number of applicable steps can be unlimited.

Referring to the display screen of FIG. 5, the first user draws a fish tank and transmits the picture of fish tank to the second user, the second user draws a fish and transmits the picture of fish to the first user, and the first user draws another fish and transmits the other picture of fish to the second user. Finally, the first user can insert the fish pictures drawn by the first user and the second user into the fish tank drawn by the first user using the picture editing module 37, thereby completing the picture with the fish in the fish tank.

The function of the picture editing module 37 can enlarge or shrink pictures drawn by the first user and the second user, and can provide a variety of editing functions, such as changing colors, deleting or copying a part of a picture.

Figure 7:
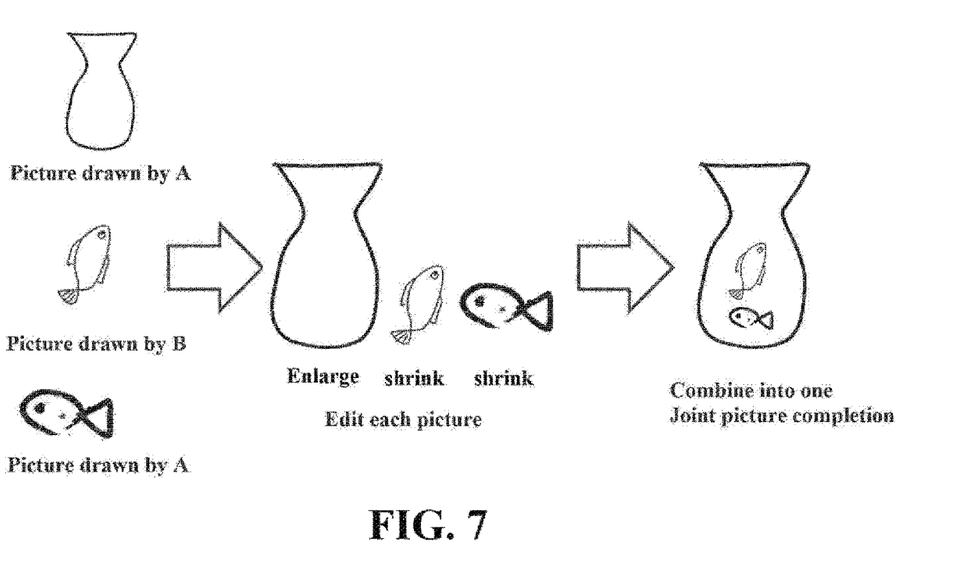
FIG. 7 is an explanatory diagram illustrating a process of completing a picture using a turn-based pictorial chatting application.

FIG. 7 is an explanatory diagram illustrating a process of completing a picture using a turn-based pictorial chat application.

Referring to FIGS. 7 and 5 together, the first user draws a fish tank picture using the picture input module 33, the second user draws a fish picture using the picture input module 33, the first user again draws a fish picture, The first user enlarges the completed fish tank picture using the picture editing module 37 so that the fish pictures can be located inside, and shrinks the fish pictures to a suitable size, the fish picture and the fish picture are combined to complete a joint picture.

A hand (or fingers) or a touch pen can be used for inputting a picture.

As described above, the present disclosure can complete a whole picture using pictures drawn by chat participants.

In addition, as in step S27, the second user may add another picture to the picture drawn by the first user.

For example, the first user draws the a beach with waves and transmits it to the second user, the second user draws cliffs on the beach picture and transmits it to the first user, the first user can complete a picture by drawing a seagull on the beach picture with the cliffs.

As such, the present disclosure enables one picture to be completed by turn-based cooperative work. One party can imagine what the other party will draw, since one party cannot draw a picture while the other party is drawing. Therefore it is possible to imagine what the other party is drawing and concentrate.

In addition, by determining a process of completing the picture, it is possible to clearly grasp the intention or emotional state of the other party, it is possible to share and heal emotions, and to add fun to the chat.

In the process of completing a picture by cooperative work as described above, when the first user or the second user inputs text via the text input module 31, the index insertion module 36 extracts a specific word from the input text.

The index insertion module 36 stores various predetermined words, finds a word that matches the stored word from the input text, and uses it as an index of the current picture data in operation.

For example, in the process of drawing the above fish, when the first user or the second user inputs the text "How about drawing fish to be put into a fish tank?" via the text input module 31, the index insertion module 36 extracts the words "fish tank" and "fish," inserts one of the words into the current picture data in operation, and stores the resultant picture in the picture storage module 34.

The text display module 32 can request to the user to select a word to use as an index of "fish tank" or "fish," and can automatically extract and use, as an index, the most frequently used word among the input texts during picture operation.

A picture data into which the index data of text is inserted is stored in the picture storage module 34, the user does not check each picture one by one to find a specific picture among the pictures stored in the picture storage module 34, a desired picture can be quickly found by searching with text.

Stored pictures can be reused.

The present disclosure is not limited to the above embodiment, it is obvious by one of ordinary skill in the art that various changes in form and details may be made therein without departing from the spirit and scope of the disclosure as defined.

The present disclosure improves the utilization of a multi-party chat application by using a smart device and is industrially applicable.

The invention claimed is:

1. A method for a pictorial chatting, comprising:
   storing a process of completing a picture in a chronological order from a start of drawing the picture when a first user draws the picture through a picture input window displayed on a display part of a user terminal, wherein a plurality of stage data capable of distinguishing positions are inserted according to a degree of completion of the picture, wherein, the plurality of stage data is not stored in a virtual memory but directly stored in picture data of the picture;
   transmitting the stored picture data to a user terminal of a second user as a chat participant;
   displaying the transmitted picture on a display of the user terminal of the second user; and
   displaying the picture drawn on the user terminal of the first user in the chronological order according to a selection of the second user or displaying the picture at a position where the stage data is inserted according to the selection of the second user.

2. The method of claim 1, further comprising:
completing the picture by adding another picture by the second user to the picture displayed on the user terminal of the second user.

3. The method of claim 1, further comprising:
transmitting a picture to the user terminal of the first user by drawing a picture different from the picture which is displayed through the user terminal of the second user; and
completing a picture by editing a picture drawn by the first user in the storing process of completing the picture and a picture drawn and transmitted by the second user.

4. The method of claim 1, wherein the second user can search for the position where the stage data is inserted and edit the picture at a specific stage.

5. The method of claim 2, further comprising:
enabling a search by adding a text index to data of the completed picture; and
wherein the text index is a text input by the first user or the second user in the process of completing the picture.

6. The method of claim 3, further comprising:
enabling a search by adding a text index to data of the completed picture; and
wherein the text index is a text input by the first user or the second user in the process of completing the picture.

7. A non-transitory computer readable medium storing a program causing a computer to execute a turn-based pictorial chat processing in a user terminal to enable chatting with a plurality of users, comprising:
a picture input module for providing a picture input window on a part of a display screen of the user terminal and storing a picture input data in a picture storage module in a chronological order so that a picture input to the picture input window can be checked according to the chronological order in the picture storage module so as to check a process of drawing the picture input in the picture input window, wherein a stage data for determining a degree of completion of the picture is inserted into picture data of the picture; wherein, the stage data is not stored in a virtual memory but directly stored in the picture data of the picture; and
a picture playback module which can play back the picture in the chronological order and moves to a position where the stage data is inserted to identify a picture of a stage.

8. The non-transitory computer readable medium of claim 7, further comprising:
an index insertion module for adding a text index to the picture input data stored in the picture storage module so as to enable a search for the picture stored by text input.

9. The non-transitory computer readable medium of claim 8, wherein the index insertion module extracts a word matching a predetermined word in the text input by the users in the process of drawing the picture and uses the extracted word as the text index.

10. The non-transitory computer readable medium of claim 7, further comprising:
a picture editing module capable of editing the picture in a state that a picture of a selected stage is displayed through the picture playback module.

11. The non-transitory computer readable medium of claim 10, wherein the picture editing module deletes a specific part from the picture of the selected stage, and receives and modifies the picture again, adjusts a size of a part of the picture, changes a color, or combines the picture with another picture to make one picture.

* * * * *